Patented July 7, 1942

UNITED STATES PATENT OFFICE 2,289,235

2,289,235

17-AMINO-ANDROSTANE COMPOUNDS

Max Bockmühl, Gustav Ehrhart, and Heinrich Ruschig, Frankfort-on-the-Main-Hochst, Germany, assignors to Winthrop Chemical Company, Inc., New York, N. Y., a corporation of New York No Drawing. Original application July 14, 1936, Serial No. 90,610. Divided and this application November 14, 1939, Serial No. 304,390. In Germany July 18, 1935

5 Claims. (Cl. 260—397.5)

The present invention relates to sterine derivatives having the character of the sexual hormones and a process of preparing them. This application is a division of our earlier application Serial No. 90,610 filed July 14, 1936, which has matured into U. S. Patent 2,188,330 issued January 30, 1940.

Processes are already known for the preparation of substances of the kind of hormones of the male germ gland (gonad) by oxidizing sterines and bile acids or the derivatives thereof.

Now we have found that by starting from the hydroxy-bis-norallo-cholanic acid there may be obtained by a new method the sterine derivatives having the character of the sexual hormones. The process is characterized by the following operations:

The epi-hydroxy-bis-norallo-cholanic acid is obtained by the oxidation of the hydroxy-bis-norallo-cholanic acid in the form of its ester so as to obtain the corresponding keto acid and by a subsequent catalytic reduction in an acid solution. By subjecting this epi-hydroxy-bis-norallo-cholanic acid, suitably in the form of its ester, twice to the Grignard process and splitting water from the tertiary alcohols produced, there is obtained the ethylene compound belonging thereto which by oxidation is transformed into the 3-epi-hydroxy-etioallo-cholanone or the ester thereof.

The process is preferably carried out as follows: The hydroxy-bis-norallo-cholanic acid which is prepared from stigmasterine is transformed, in the form of its ester, into the corresponding keto acid by oxidation with chromic acid. By a catalytic reduction in an acid solution this keto acid is transformed again into the alcohol acid with the production of the epi-configuration of the hydroxyl. By causing the Grignard reagent, such as $C_6H_5MgBr$ to act upon the ester of the hydroxy acid there is obtained the tertiary alcohol which by heating it under reduced pressure or with glacial acetic acid or acetic anhydride is transformed into the ethylene derivative belonging thereto. By an oxidizing agent, such as ozone, the ethylene derivative may be transformed into the ketone belonging thereto, an isomeric product of the allopregnanol-(3)-on (20) to be found in the female germ gland. By causing the Grignard reagent to act again on the keto compound obtained, by a separation of water and on oxidation there is produced the 3-epi-aceto-oxy-etioallo-cholanone which by saponification is transformed into the corresponding keto alcohol.

The process may also be modified as follows: the 3-epi-acyl-oxy-bis-norallo-cholanic acid ester obtained according to the process of the invention is subjected once to the Grignard reagent and the ethylene compound obtained after a subsequent separation of water is oxidized so as to obtain the epi-acyloxy-etioallo-cholanic acid. This acid may be further treated either by subjecting it again, in the form of its ester, to the action of the Grignard reagent with a subsequent separation of water and oxidation, whereby the 3-epi-hydroxy-etioallo-cholanone is obtained, or by transforming it according to the Curtius decomposition process or another method, by way of the amines belonging thereto into the corresponding cyclic carbinoles and, if required oxidizing these cyclic carbinoles.

The new process makes it possible to obtain by a cheaper method than in the case of the known processes, the androsterone and other compounds of a similar constitution.

The following examples serve to illustrate the invention, but they are not intended to limit it thereto:

(1) The manufacture of the 3-epi-hydroxy-bis-norallo-cholanic acid.

(a) 10 grams of acetoxy-bis-norcholenic acid in a solution of 300 cc. of ether and 300 cc. of glacial acetic acid containing 3 grams of palladium are shaken with hydrogen until saturation is complete. After the catalyst has been filtered, the solvent is evaporated under reduced pressure and the residue is redissolved in acetone. The melting point of the acetoxy-bis-norcholanic acid is 194° C. The yield amounts to 8 grams.

(b) 5 grams of hydroxy-bis-norallo-cholanic acid of the Formula I of the table contained herein are allowed to stand for one night in 500 grams of glacial acetic acid of 90 per cent. strength containing 1.5 grams of chromic anhydride. The solution is then poured in water, the aqueous mixture is extracted with ether and the residue left on evaporating the ether extract is redissolved. The melting point of the keto-bis-norallo-cholanic acid is 244° C. The yield amounts to 4 grams.

(c) 5 grams of the keto-bis-norallo-cholanic acid of the Formula II are shaken with hydrogen until saturation occurs in 300 cc. of glacial acetic acid to which suitably some drops of hydrogen bromide or sulfuric acid have been added and which contains 3 grams of palladium. After the catalyst has been filtered, the solvent is strongly concentrated, diluted with water and the aqueous mixture is extracted with ether. The residue obtained by evaporating the ether extract is immediately boiled for 1½ hours with acetic anhydride. The 3-epi-acetoxy-norallo-cholanic acid obtained after the evaporation of the acetic anhydride is methylated at once with ethereal diazo-methane solution.

Instead of the acetoxy compound there may also be prepared other acyloxy compounds, for instance from propionic acid or butyric acid.

(2) Decomposition of the 3-epi-acetoxy-bis-norallo-cholanic acid methyl ester having the Formulae III, IV and V.

(a) 12 grams of the ester are added to a Grignard solution prepared from 8 grams of magnesium and 30 cc. of bromo-benzene and the mixture is heated for 5 hours on the water bath. After the solvent has been distilled, the residue is heated for 10 hours on the water bath and then suspended in water and the acidified aqueous mixture is extracted with ether. The residue of the ethereal solution which is now free from the magnesium hydroxide formed is distilled under a high vacuum. The first runnings which distill below 200° C. are not used.

(b) The main distillate which contains practically only the ethylene compound of the Formula V is dissolved at once, without a further purification, in 400 cc. of chloroform and a current of ozone of 3 per cent strength is passed through the solution until saturation occurs. The strongly concentrated solution is boiled with water whereby separation of the ozonide occurring thereby. The layer of chloroform is then separated and its residue from its evaporation is distilled under a high vacuum. During this process the benzo-phenone which is formed during the reaction distills at 130° C.; the reaction product desired having the Formula VI then distils as main fraction.

(c) This main fraction which is obtained in a yield of 4 grams is immediately subjected again to a Grignard reaction, as described in Example 2a. After the magnesium hydroxide has been removed the oily constituents are distilled under a high vacuum, whereby water is split off and the ethylene derivative is formed again (see Formulae VII and VIII). This main fraction is treated with ozone as described in Example 2b. The residue obtained by evaporating the chloroform layer is boiled together with semicarbazide-HCl and sodium acetate in alcohol. During this operation the semicarbazone of the 3-epi-acetoxy-ethioallocholanone, when cold, forms a precipitate and is split upon the water bath by means of concentrated oxalic acid solution. After the solution has been diluted with water and the aqueous mixture has been extracted with ether the residue of the ether extract is dedissolved in dilute alcohol and for a further purification the 3-epiacetoxy-etioallocholanone of the Formula IX is distilled under a high vacuum. The fusing point is 164° C.

(3) The manufacture of the 3-epi-acetoxy-etioallo-cholanic acid and the decomposition thereof:

(a) The ethylene compound or the carbinol (IV) obtained as described in Example 2a is heated in glacial acetic acid on the water bath and 100 cc. of chromic acid solution containing 18 grams of chromic acid in 150 cc. of glacial acetic acid of 90 per cent. strength is slowly added thereto. As soon as the oxidation is complete, the solution is diluted with water, extracted with ether and by shaking the ether with 2n-caustic soda solution there is obtained the sodium salt of the 3-epi-acetoxy-etioallo-cholanic acid of the Formula X. By a decomposition with acid and a repeated precipitation the acid is further purified. The acid, just as the corresponding propio-oxy acid and butyro-oxy acid is soluble in organic solvents, miscible with water, soluble in aqueous alkalies and forms a silver salt sparingly soluble in water.

(b) This acid is then covered by pouring an ethereal diazo-methane solution thereon and after the reaction is complete the residue of the ethereal solution is subjected to a Grignard reaction as described in Example 2a. After the elimination of the magnesium hydroxyde and the distillation under a high vacuum the main fraction is heated for an hour with acetic anhydride. The residue left by evaporating the acetic anhydride contains the ethylene compound having the Formula VIII and is treated with ozone and worked up as described in Example 2b.

(4) 2 grams of the acid obtained as described in Example 3a are heated for 1½ hours in 20 cc. of dry benzene together with 6 grams of thionyl chloride. The solution is then evaporated under reduced pressure and the residue is taken up in a small quantity of acetone. The acetone solution is then cooled to 0°, no solid substance being allowed to separate. The solution is then slowly mixed with twice the quantity of purest sodium azide which has been dissolved in a small quantity of water and the solution of which has likewise been cooled to 0°. During this operation the 3-epiacetoxy-etioallo-cholanic acid azide separates. After cooling for a short time in a mixture of ice and salt the separation is complete. The azide is filtered with suction and as it may readily become oily when exposed to the action of air, it is at once dissolved in toluene. The toluene solution is then gradually heated in a paraffin bath, during which operation nitrogen separates and the isocyanate is formed. After the separation of the gas is complete, the solution is evaporated under reduced pressure and the residue is saponified with aectic anhydride. The gas which has separated is suitably collected so as to recognize when the reaction is terminated. The acetyl amino derivative formed is saponified in alcoholic alkali of 10 per cent. strength and the free amine, the so-called 3-epihydroxy-17-amino-androstane or the hydrochloride thereof is heated on the water bath with twice the quantity of sodium nitrite in a weakly acid solution or with silver nitrite. During this operation there is formed the dihydro-androsterone which, if required after redissolving it or distilling it again has the melting point of 221° C. The reaction occurs according to the Formulae X to XV of the table contained herein.

The isocyanate may also be saponified as follows: 2 grams of epi-acetoxyethioallo-cholanyl-isocyanate (17) are dissolved in 20 cc. of ether and 20 cc. of benzene; 50 grams of sulfuric acid of 60 per cent. strength are poured into the solution so that they form the bottom layer. The whole is then thoroughly stirred, the separation of the corresponding amine sulfate occurring. When the separation is complete, water is added to the mixture and the whole is centrifuged. The precipitate is then taken up in an alcoholic caustic potash solution of 5 per cent. strength and the solution is extracted with ether after having been diluted with water. After the ether has been dried the amine can be precipitated with hydrochloric acid. The amine is then transformed, as described above, into the dihydro-androsterone. The 3-epihydroxy-17-aminoandrostane or its 3-acyloxy derivatives, particularly the 3-acetyl-oxy-derivatives decompose when heated at about 300° C. and form hydrochlorides; they are recrystallizable from alcohol in the presence of hydrochloric acid or from aqueous alcohol.

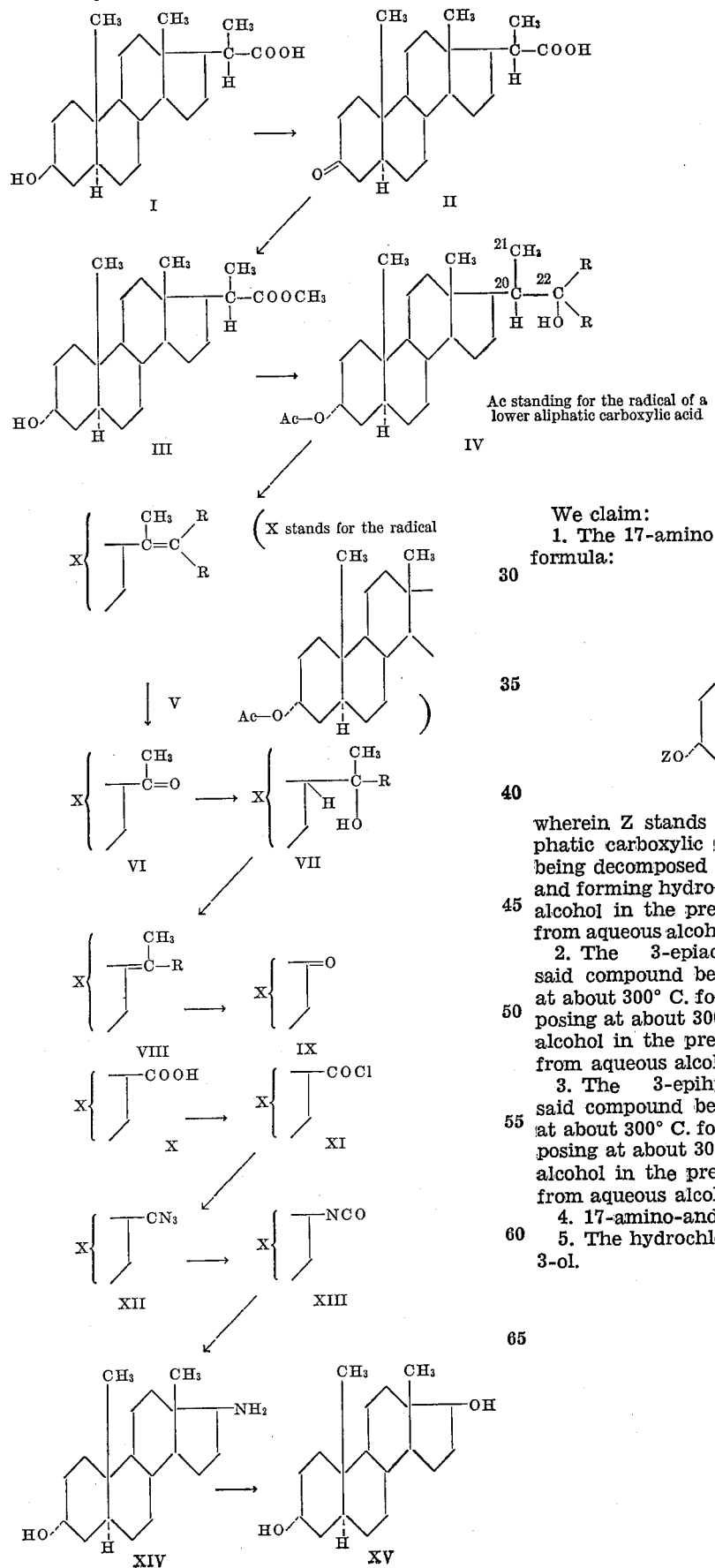

We claim:
1. The 17-amino-androstanes of the following formula:

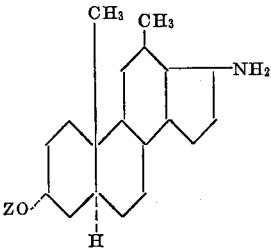

wherein Z stands for hydrogen or a lower aliphatic carboxylic acid radical; said compounds being decomposed when heated at about 300° C. and forming hydrochlorides, recrystallizable from alcohol in the presence of hydrochloric acid or from aqueous alcohol.

2. The 3-epiacetyloxy-17-amino-androstane, said compound being decomposed when heated at about 300° C. forming a hydrochloride decomposing at about 300° C. and recrystallizable from alcohol in the presence of hydrochloric acid or from aqueous alcohol.

3. The 3-epihydroxy-17-amino-androstane, said compound being decomposed when heated at about 300° C. forming a hydrochloride decomposing at about 300° C. and recrystallizable from alcohol in the presence of hydrochloric acid or from aqueous alcohol.

4. 17-amino-androstane-3-ol.

5. The hydrochloride of 17-amino-androstane-3-ol.

MAX BOCKMÜHL.
GUSTAV EHRHART.
HEINRICH RUSCHIG.